(12) United States Patent
Choi

(10) Patent No.: US 6,621,541 B1
(45) Date of Patent: Sep. 16, 2003

(54) TRANSFLECTIVE LIQUID CRYSTAL DISPLAY DEVICE HAVING AN ELECTROPHORETIC DISPLAY

(75) Inventor: Su-Seok Choi, Kyoggi-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 353 days.

(21) Appl. No.: 09/670,836

(22) Filed: Sep. 28, 2000

(30) Foreign Application Priority Data

Sep. 28, 1999 (KR) ......................................... 1999-41434

(51) Int. Cl.[7] ............................................. G02F 1/1336
(52) U.S. Cl. ......................................... 349/113; 349/114
(58) Field of Search .................................. 349/113, 114

(56) References Cited

U.S. PATENT DOCUMENTS 5,493,430 A * 2/1996 Lu et al. ...................... 349/106
5,587,264 A * 12/1996 Iijima et al. ................ 430/57.1

* cited by examiner

*Primary Examiner*—James Dudek
(74) *Attorney, Agent, or Firm*—Birch, Stewart, Kolasch & Birch, LLP

(57) ABSTRACT

A transflective liquid crystal display device includes a liquid crystal panel, an electrophoretic display arranged under the liquid crystal panel, and a backlight device arranged under the electrophoretic display. The electrophoretic display has a first conducting electrode, a second conducting electrode, and transparent liquid interposed between the first and second panels. Charged pigment particles are suspended in the liquid, and are attracted to the first or second conducting electrodes depending on a polarity of a voltage applied. When the particles are attracted to the first electrode, light from the backlight is able to be transmitted to the liquid crystal panel. When the particles are attracted to the second electrode, light from external to the device is reflected from a layer of the particles on the second electrode.

24 Claims, 6 Drawing Sheets

TRANSFLECTIVE LIQUID CRYSTAL DISPLAY DEVICE HAVING AN ELECTROPHORETIC DISPLAY

CROSS REFERENCE

This application claims the benefit of Korean Patent Application No. 1999-41434, filed on Sep. 28, 1999, under 35 U.S.C. §119, the entirety of which is hereby incorporated by reference.

BACKGROUND

1. Field of the Invention

The present invention relates to a liquid crystal display (LCD) device, and more particularly, to a transflective LCD device.

2. Description of Related Art

In general, liquid crystal displays are divided into transmissive LCD devices and reflective LCD devices according to whether the display uses an internal or external light source.

A typical transmissive LCD device includes a liquid crystal panel and a back light device. The liquid crystal panel includes upper and lower substrates with a liquid crystal layer interposed. The upper substrate includes a color filter, and the lower substrate includes thin film transistors (TFTs) as switching elements. An upper polarizer is arranged on the liquid crystal panel, and a lower polarizer is arranged between the liquid crystal panel and the backlight device.

The two polarizers have a transmittance of 45% and, the two substrates have a transmittance of 94%. The TFT array and the pixel electrode have a transmittance of 65%, and the color filter has a transmittance of 27%. Therefore, the typical transmissive LCD device has a transmittance of about 7.4% as seen in FIG. 1, which shows a transmittance (in brightness %) after light passes through each layer of the device. For this reason, the transmissive LCD device requires a high, initial brightness, and thus electric power consumption by the backlight device increases. A relatively heavy battery is needed to supply a sufficient power to the backlight of such a device. However, this has a problem that the battery can not be used for a lengthy period of time.

In order to overcome the problem described above, the reflective LCD has been developed. Since the reflective LCD device uses ambient light, it is light and easy to carry. Also, the reflective LCD device is superior in aperture ratio to the transmissive LCD device.

FIG. 2 shows a typical reflective LCD device in cross section. As shown in FIG. 2, the reflective LCD device includes upper and lower substrates 8 and 10 with a liquid crystal layer 12 interposed. The upper substrate 8 includes color filter layers 4a, 4b and 4c (e.g., red, green, and blue) and a common electrode 6. The lower substrate 10 includes a switching element (not shown) and a reflective electrode 2.

Ambient light 100 passes through the upper substrate 8 and the liquid crystal layer 12 and is reflected on the reflective electrode 2. When electrical signals are applied to the reflective electrode 2 by the switching element, phase of the liquid crystal layer 12 varies. Then, reflected light is colored by the color filter layers 4a, 4b and 4c and displayed in the form of images.

However, the reflective LCD device is affected by its surroundings. For example, the brightness of ambient light in an office differs largely from that outdoors. Even in the same location, the brightness of ambient light depends on the time of day (e.g., noon or dusk).

In order to overcome the problems described above, a transflective LCD device has been developed. FIG. 3 shows a conventional transflective LCD device. As shown in FIG. 3, the conventional transflective LCD device includes upper and lower substrates 22 and 18 with a liquid crystal layer 20 interposed. The upper substrate 22 includes a color filter 104, and the lower substrate 18 includes a switching element (not shown), a pixel electrode 14 and a reflective electrode 2. The reflective electrode 2 is made of an opaque conductive material having a good reflectance and light transmitting holes "A" are formed therein. The transflective LCD device further includes a backlight device 16. The light transmitting holes "A" serve to transmit light 112 from the backlight device 16.

The transflective LCD device in FIG. 3 is operable in transmissive and reflective modes. First, in reflective mode, the incident light 110 from the upper substrate 22 is reflected on the reflective electrode 2 and directed toward the upper substrate 22. At this time, when electrical signals are applied to the reflective electrode 2 by the switching element (not shown), phase of the liquid crystal layer 20 varies and thus the reflected light is colored by the color filter 104 and displayed in the form of images.

Further, in transmissive mode, light 112 generated from the backlight device 16 passes through portions of the pixel electrode 14 corresponding to the transmitting holes "A". When the electrical signals are applied to the pixel electrode 14 by the switching element (not shown), phase of the liquid crystal layer 20 varies. Thus, the light 112 passing through the liquid crystal layer 20 is colored by the color filter 104 and displayed in the form of images.

As described above, since the transflective LCD device has both transmissive and reflective modes, the transflective LCD device can be used without regard to the time of day (e.g., noon or dusk). It also has the advantage that it can be used for a long time by consuming low power. However, since the reflective electrode has the transmitting holes "A", the conventional transflective LCD device has a very low light utilizing efficiency compared to either the reflective LCD device or the transmissive LCD device alone.

FIG. 4A shows a conventional reflective electrophoretic display. As shown in FIG. 4A, the reflective electrophoretic display 300 includes a front panel 24 having a first conducting electrode 25a and a first substrate 2a, and a rear panel 26 having a second conducting electrode 25b and a second substrate 2b. The display 300 also includes a suspension of charged pigment particles 30 colloidally dispersed in a dyed liquid 28 interposed between the front and rear panels 24 and 26.

The reflective electrophoretic display 300 operates as follows. As shown in FIG. 4B, when a d.c. voltage is applied to the first and second conducting electrodes 25a and 25b, charged pigment particles 30 contained in a dyed liquid 28 move and are packed on the first conducting electrode 25a having the same polarity so that the pigment particle layer 30a is formed. If polarity of the d.c. voltage is changed, the charged pigment particles 30 are packed (not shown) on the second conducting electrode 25b. When the pigment is packed on the first conducting electrode 25a, the color of the pigment will be seen by the observer with ambient light. When the pigment is packed on the second conducting electrode 25b, the ambient room light is absorbed and scattered by the dyed liquid 28 and the color of the dye is observed.

However, such a display utilizing electrophoresis has a problem that its response speed is slow, and it requires a high operating voltage. Further, pixelization is technically difficult. Also, the performance of the electrophoretic display above is far inferior to the LCD device.

SUMMARY OF THE INVENTION

Accordingly, the present invention is directed to a transflective liquid crystal display device that substantially obviates one or more of the problems due to limitations and disadvantages of the related art.

In accordance with the purpose of the invention, as embodied and broadly described, in one aspect the invention includes a transflective liquid crystal display device, including: a liquid crystal panel including a first substrate having a color filter, a second substrate having a switching element and a pixel electrode, and a liquid crystal layer interposed between the first and second substrates; an electrophoretic display arranged under the liquid crystal panel, the electrophoretic display including a first panel having a first conducting electrode which defines a transmitting region for transmitting light at a location corresponding to the pixel electrode, a second panel having a second conducting electrode, and a transparent liquid interposed between the first and second panels and having charged pigment particles; and a backlight device arranged under the electrophoretic display.

In another aspect, the invention includes a transflective liquid crystal display device, including: a liquid crystal panel including first and second substrates with liquid crystal material therebetween arranged to define a plurality of pixels, the second substrate including a switching element and a transparent electrode in each pixel; an electrophoretic display arranged under the liquid crystal panel, the electrophoretic display including a first panel having a first conducting electrode which defines a plurality of transmitting regions for transmitting light in each pixel at locations corresponding to the transparent electrodes, a second panel having a second conducting electrode, and a transparent liquid interposed between the first and second panels and having charged particles therein, wherein a voltage applied between the first and second conducting electrodes determines whether the transflective liquid crystal display device operates in a transmissive mode or in a reflective mode; and a backlight device arranged under the electrophoretic display.

In still another aspect, the invention includes a method of operating a transflective liquid crystal display, the transflective liquid crystal display having a liquid crystal panel, a backlight, and an electrophoretic display arranged therebetween, the electrophoretic display including two electrodes and charged particles suspended in a liquid, the method including: applying a voltage having a polarity between the two electrodes to attract the charged particles to one of the two electrodes and allow light from the backlight to exit the transflective liquid crystal display; and applying a voltage having an opposite polarity between the two electrodes to attract the charged particles to another of the two electrodes to form a layer of particles which reflects light from external to the transflective liquid crystal display.

In another aspect, the invention includes a transflective liquid crystal display device, including: a liquid crystal panel having a plurality of switchable pixels operable to selectively transmit light; a backlight arranged under the liquid crystal panel; and an electrophoretic device arranged between the liquid crystal panel and the backlight operable to selectively transmit light from the backlight or reflect light from external to the transflective liquid crystal display device based on a polarity of a voltage applied thereto.

Preferred embodiments of the present invention provide a transflective liquid crystal display device advantageously having improved light utilizing efficiency, good contrast, and brightness.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate one embodiment of the invention and together with the description serve to explain the principles of the invention.

BRIEF DESCRIPTION OF THE DRAWINGS

For a more complete understanding of the present invention and the advantages thereof, reference is now made to the following descriptions taken in conjunction with the accompanying drawings, in which like reference numerals denote like parts, and in which.

DETAILED DESCRIPTION OF PREFERRED EMBODIMENTS

Reference will now be made in detail to the preferred embodiment of the present invention, example of which is illustrated in the accompanying drawings.

Figure 1:
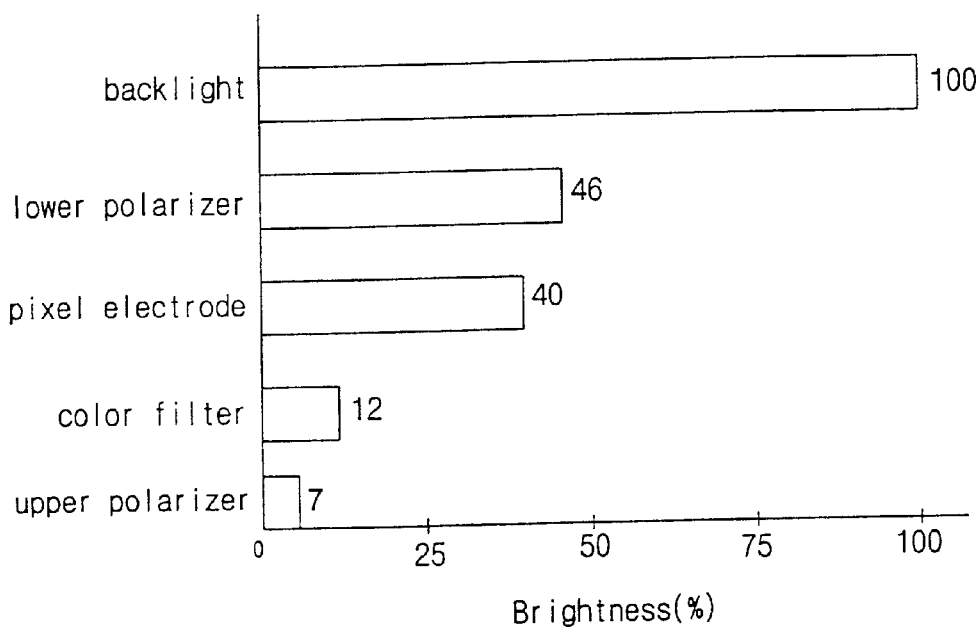
FIG. 1 is a graph illustrating transmittance after light passes through each layers of a typical transmissive LCD device.
Figure 2:
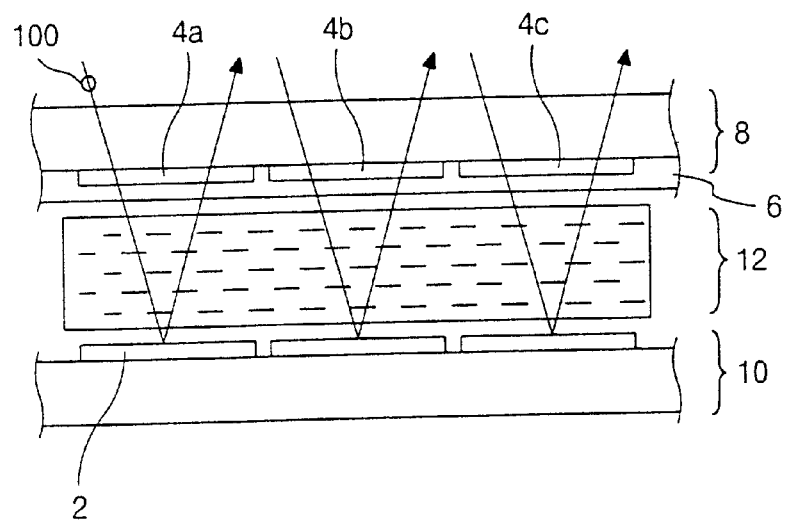
FIG. 2 is a cross-sectional view illustrating a typical reflective LCD device.
Figure 3:
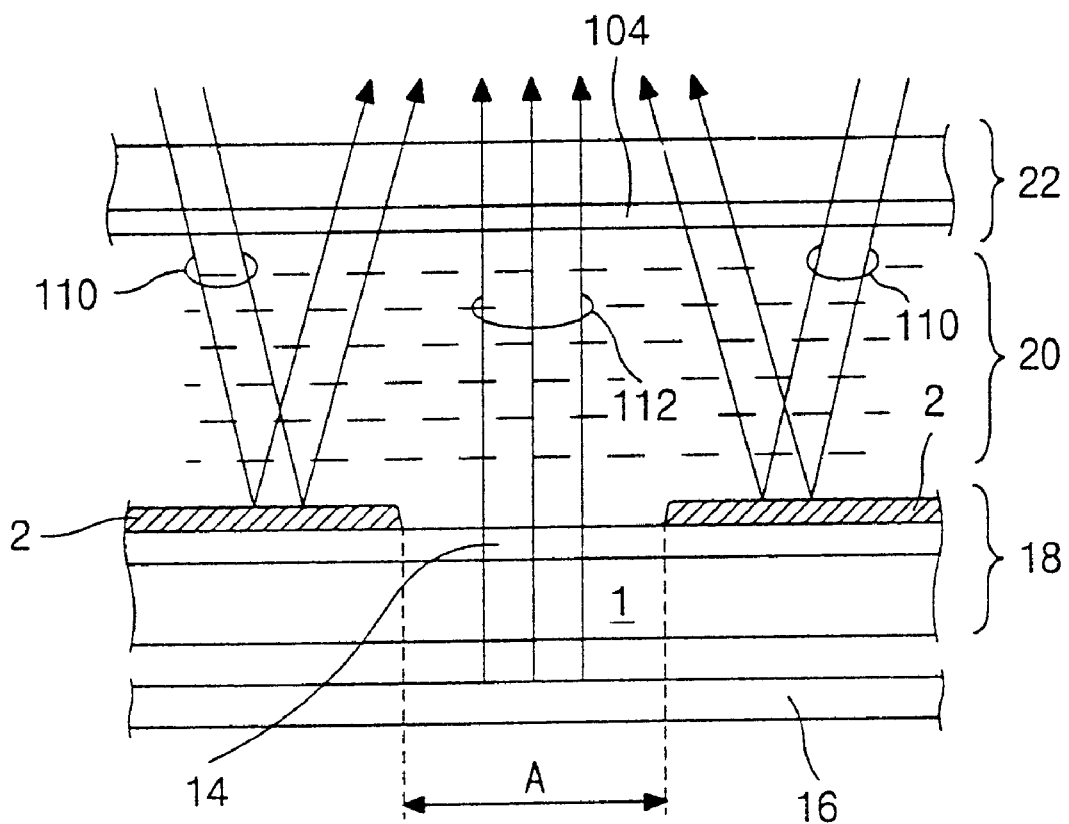
FIG. 3 is a cross-sectional view illustrating a conventional transflective LCD device.
Figure 4A:
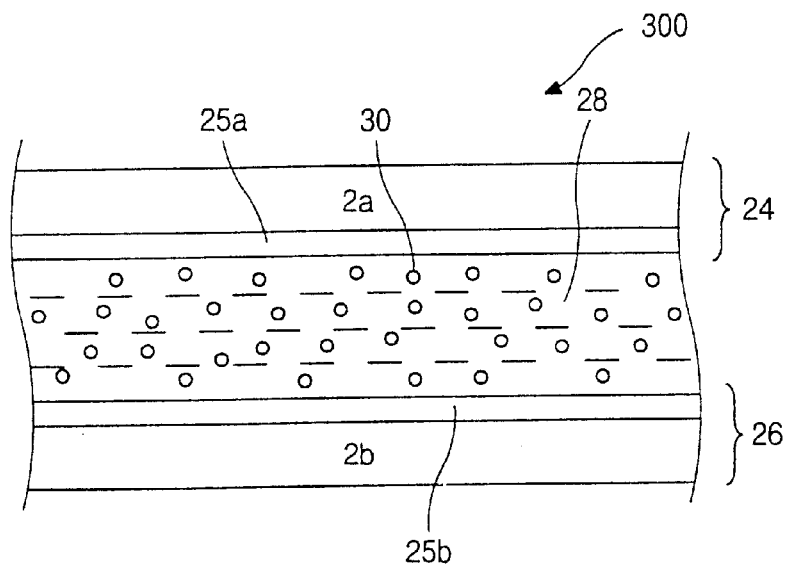
FIGS. 4A and B are cross-sectional views illustrating a typical reflective electrophoretic display.
Figure 4B:
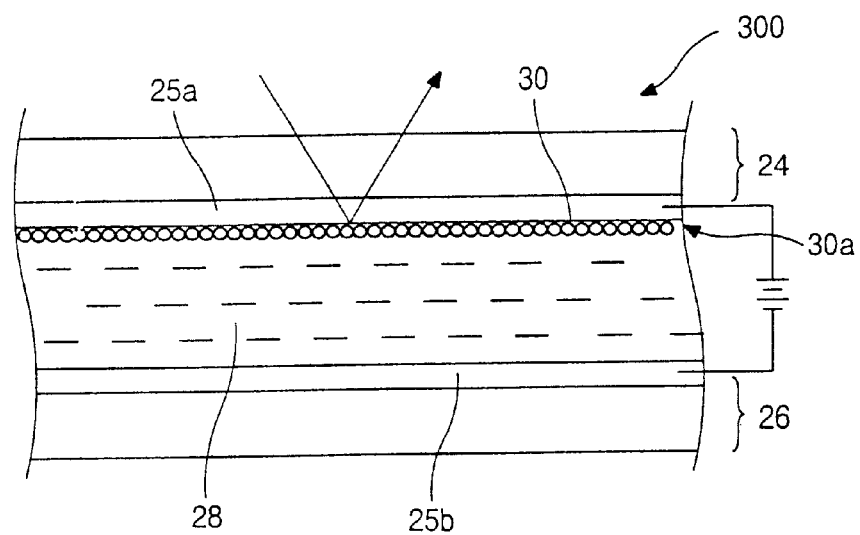
Figure 5:
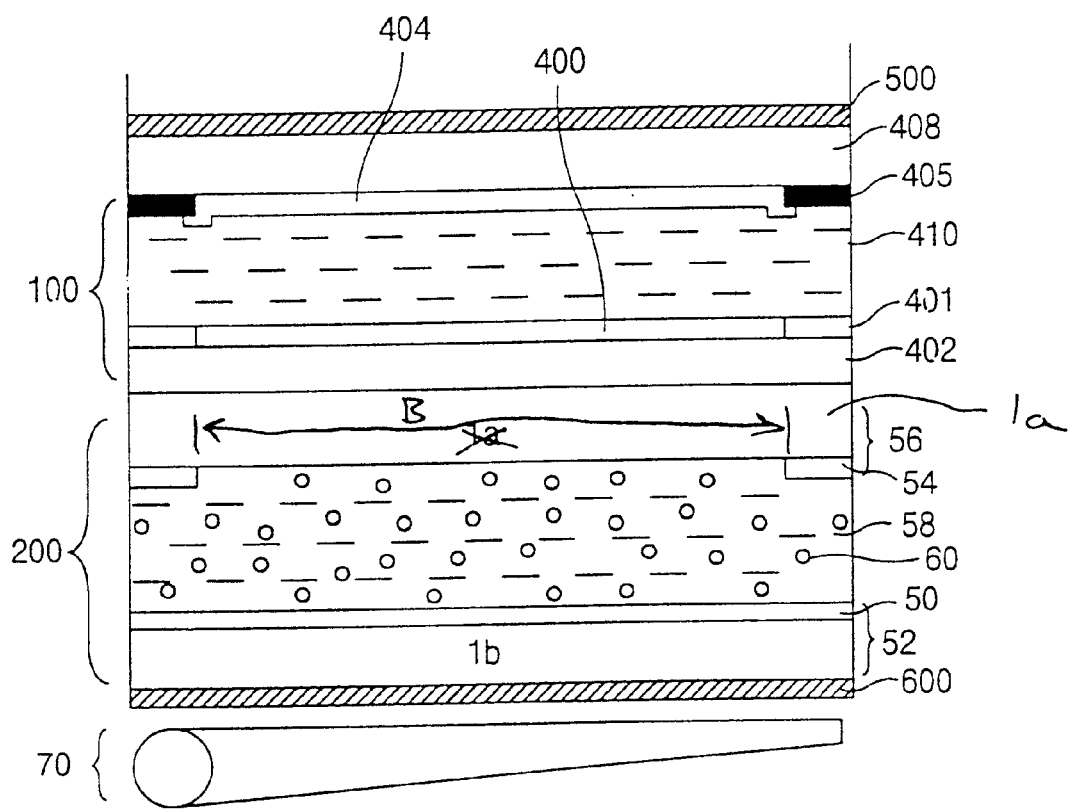
FIG. 5 is a cross-sectional view illustrating a transflective liquid crystal display (LCD) device according to a preferred embodiment of the present invention.

FIG. 5 is a cross-sectional view illustrating a configuration corresponding to one pixel of a transflective LCD device according to a preferred embodiment of the present invention. As shown in FIG. 5, the inventive transflective LCD device includes a first polarizer 500, a liquid crystal panel 100, an electrophoretic display 200, a backlight device 70, and a second polarizer 600 which are stacked in the above-described order.

The liquid crystal panel 100 includes upper and lower substrates 408 and 402 with a liquid crystal layer 410 interposed therebetween. The upper substrate 408 has a color filter 404, a black matrix layer 405 attached, and the lower substrate 402 has a thin film transistor 401 as a switching element and a pixel electrode 400 attached. The upper substrate 408 may also include a common electrode (not shown). The color filter 404 may include red, green, and blue filters arranged on different pixels of the panel 100.

Figure 6:
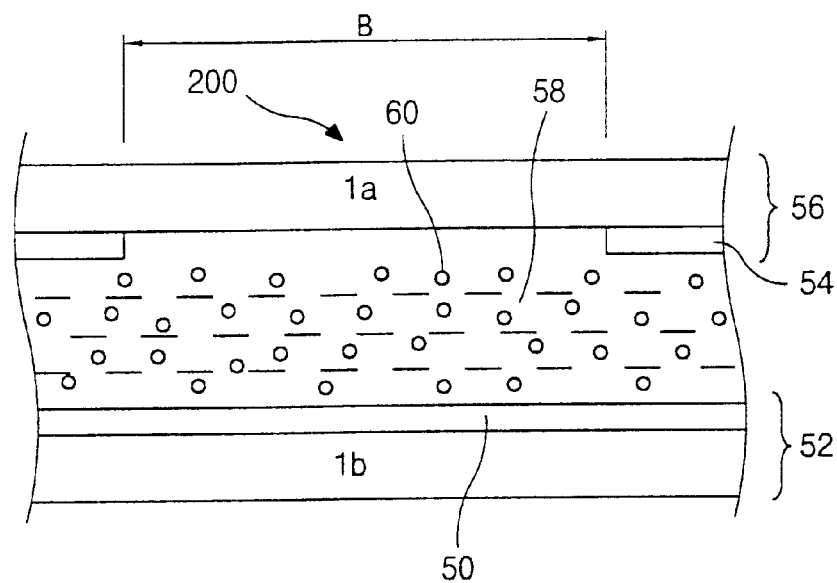
FIG. 6 is a cross-sectional view illustrating a configuration of an electrophoretic display for used in the transflective LCD device according to the preferred embodiment of the present invention.

As shown in FIGS. 5 and 6, the inventive electrophoretic display 200 comprises a front panel 56 having a first conducting electrode 54 and a first substrate la, and a rear panel 52 having a second conducting electrode 50 and a second substrate lb. It also includes a suspension of charged pigment particles 60 dispersed in a transparent liquid 58 interposed between the front and rear panels 56 and 52. The first conducting electrode 54 has a transmitting region "B" at a location corresponding to the pixel electrode 400. The first conducting electrode 54 excluding the transmitting region "B" is formed at a location corresponding to the black matrix layer 405 of the liquid crystal panel 100, improving the light transmittance. The first conducting electrode 54 serves as a collecting electrode, and the second conducting electrode 50 serves as a reflective electrode. A transparent solvent is preferably used as the liquid 58. The first and second conducting electrodes 54 and 50 are preferably made of a transparent conducting oxide such as indium tin oxide (ITO).

Alternatively, the first conducting electrode 54 having a transmitting region "B" can be formed on the rear panel 52, and the second conducting electrode 50 can be formed on the front panel 56. Though not shown in the figures, such an alternate arrangement just reverses the locations of electrodes 50 and 54 in, for example, FIG. 6.

The electrophoretic display 200 serves to reflect ambient light in a reflective mode and to transmit light from the backlight device 70 in a transmissive mode. In other words, when the electrophoretic display 200 performs in the reflective mode, the inventive transflective LCD device acts like the reflective LCD device using ambient light. When the electrophoretic display 200 performs in the transmissive mode, the inventive transflective LCD device acts like the transmissive LCD device using light from the backlight 70.

Figure 7A:
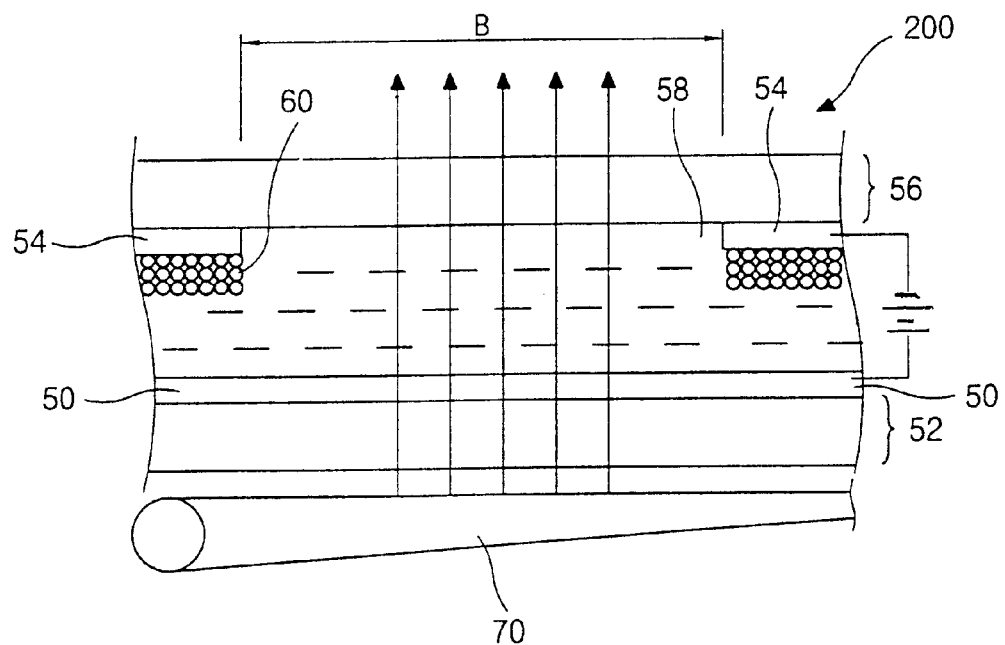
FIG. 7A is a cross-sectional view illustrating operation of the electrophoretic display when in a transmissive mode according to the preferred embodiment of the present invention.

The electrophoretic display 200 operates as follows in the transmissive mode. It should note that pigment particles 60 are positively charged. As shown in FIG. 7A, when a negative d.c. voltage is applied to the first conducting electrode 54 and a positive d.c. voltage is applied to the second conducting electrode 50, the charged pigment particles 60 are packed on the first conducting electrode 54 to which a negative voltage is applied. Therefore, light from the backlight device 70 passes through the transmitting region "B" and is emitted toward the liquid crystal panel without any obstruction of the pigment particles 60.

Figure 7B:
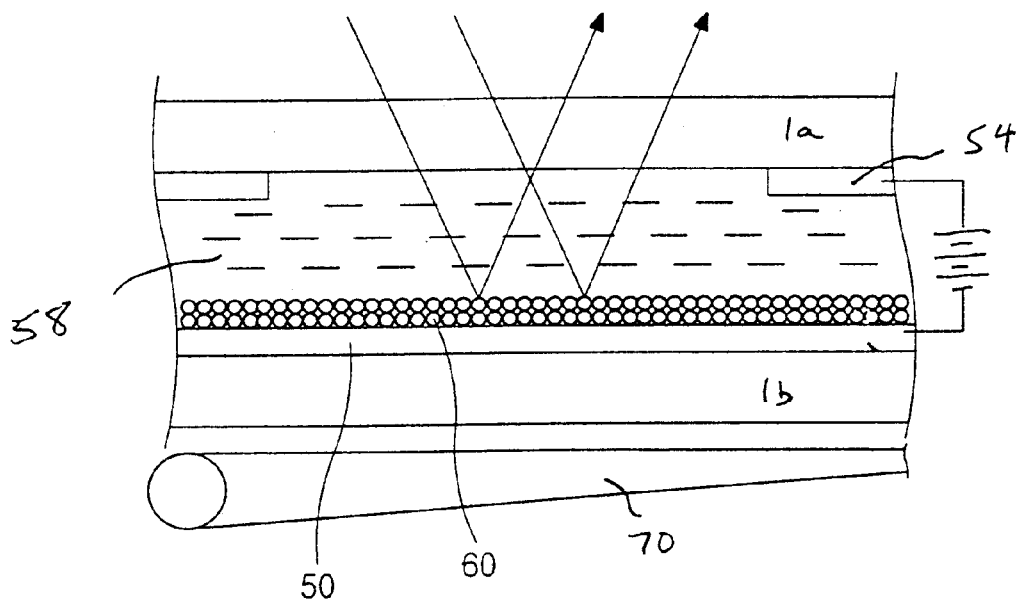
FIG. 7B is a cross-sectional view illustrating operation of the electrophoretic display when in a reflective mode according to the preferred embodiment of the present invention.

To perform the reflective mode, a negative voltage is applied to the second conducting electrode 50 and a positive voltage is applied to the first conducting electrode 54 as shown in FIG. 7B. The positively charged pigment particles 60 are collected and form a line on a front surface of the second conducting electrode 50. Therefore, ambient light incident to the electrophoretic display is reflected from the pigment particles 60. That is, the second conducting electrode 50 when coated with the particles 60 serves as a reflective electrode that reflects ambient light.

In addition, in the absence of an electrical field applied between the electrodes, the electrophoretic display has a memory effect due to the existence of Van der Waals forces and erasure can only be obtained by applying an oppositely directed electrical field. Therefore, the electrophoretic display has low power consumption, because a voltage only needs to be applied to change modes in the display.

Figure 8:
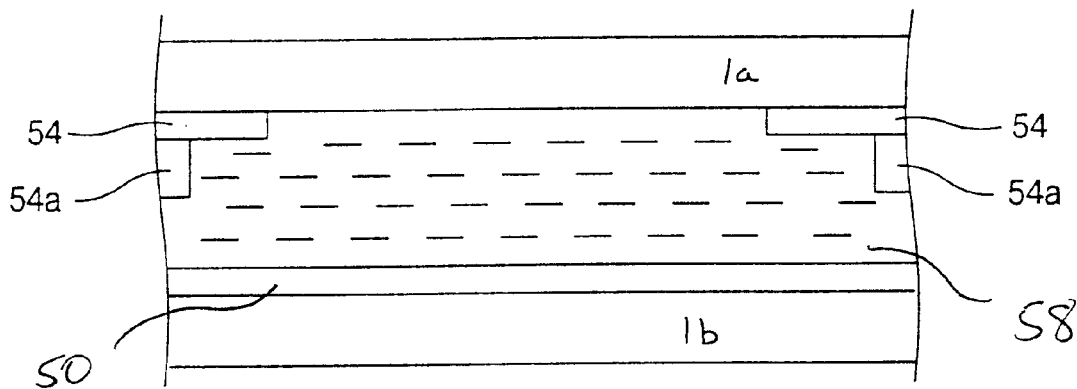
FIG. 8 is a cross-sectional view illustrating another configuration of the electrophoretic display for used in the transflective LCD device according to the preferred embodiment of the present invention.

FIG. 8 is a cross-sectional view illustrating another configuration of the electrophoretic display for used in the transflective LCD device according to the present invention. As shown in FIG. 8, in order to increase a surface area on which the pigment particles 60 are collected, an additional collecting electrode 54a is formed on a bottom surface of the first conducting electrode 54. Therefore, since a surface area on which the charged pigment particles 60 are collected increases, the charged pigment particles 60 which are collected on the electrodes 54 and 54a also increase in number. In this manner, fewer pigment particles remain in the liquid 58, and the transmissivity of the liquid improves.

As described herein before, using the transflective LCD device according to the preferred embodiment of the present invention, since light utilizing efficiency is improved, good contrast and brightness can be achieved.

While the invention has been particularly shown and described.with reference to preferred embodiments thereof, it will be understood by those skilled in the art that the foregoing and other changes in form and details may be made therein without departing from the spirit and scope of the invention.

What is claimed is:

1. A transflective liquid crystal display device, comprising:
   a liquid crystal panel including:
      a first substrate having a color filter,
      a second substrate having a switching element and a pixel electrode, and
      a liquid crystal layer interposed between the first and second substrates;
   an electrophoretic display arranged under the liquid crystal panel, the electrophoretic display including:
      a first panel having a first conducting electrode which defines a transmitting region for transmitting light at a location corresponding to the pixel electrode,
      a second panel having a second conducting electrode, and
      a transparent liquid interposed between the first and second panels and having charged pigment particles; and
   a backlight device arranged under the electrophoretic display.

2. The transflective liquid crystal display of claim 1, wherein the first conducting electrode further includes
   a collecting electrode arranged in contact with the first conducting electrode, thereby increasing a surface area of the first conducting electrode.

3. The transflective liquid crystal display of claim 1, wherein the first panel of the electrophoretic display is arranged over the second panel.

4. The transflective liquid crystal display of claim 1, wherein the second panel of the electrophoretic display is arranged over the first panel.

5. The transflective liquid crystal display of claim 1, wherein the first and second conducting electrodes are made of indium tin oxide (ITO).

6. The transflective liquid crystal display of claim 1, wherein the transparent liquid is a transparent solvent.

7. The transflective liquid crystal display of claim 1, wherein the first substrate of the liquid crystal panel includes:
   an opaque matrix layer in areas adjacent to the color filter; and wherein the first conducting electrode of the electrophoretic display is formed at a location below and corresponding to the opaque matrix layer.

8. The transflective liquid crystal display of claim 1, wherein when a voltage is applied to the first conducting electrode so as to attract the charged pigment particles, the transflective liquid crystal display operates in a transmissive mode.

9. The transflective liquid crystal display of claim 1, wherein when a voltage is applied to the second conducting electrode so as to attract the charged pigment particles, the transflective liquid crystal display operates in a reflective mode.

10. A transflective liquid crystal display device, comprising:
   a liquid crystal panel including:
      first and second substrates with liquid crystal material therebetween arranged to define a plurality of pixels, the second substrate including a switching element and a transparent electrode in each pixel;
   an electrophoretic display arranged under the liquid crystal panel, the electrophoretic display including:
      a first panel having a first conducting electrode which defines a plurality of transmitting regions for transmitting light in each pixel at locations corresponding to the transparent electrodes,
      a second panel having a second conducting electrode, and
      a transparent liquid interposed between the first and second panels and having charged particles therein, wherein a voltage applied between the first and second conducting electrodes determines whether the transflective liquid crystal display device operates in a transmissive mode or in a reflective mode; and
   a backlight device arranged under the electrophoretic display.

11. The transflective liquid crystal display of claim 10, wherein when a voltage is applied to the first conducting electrode so as to attract the charged particles and remove the particles from the transmitting regions, the transflective liquid crystal display operates in a transmissive mode.

12. The transflective liquid crystal display of claim 10, wherein when a voltage is applied to the second conducting electrode so as to attract the charged pigment particles to the second conducting electrode across the transmitting regions, the transflective liquid crystal display operates in a reflective mode.

13. The transflective liquid crystal display of claim 11, wherein the first conducting electrode further includes
   a collecting electrode arranged in contact with the first conducting electrode to increase a surface area of the first conducting electrode.

14. The transflective liquid crystal display of claim 10, wherein the first panel of the electrophoretic display is arranged over the second panel.

15. The transflective liquid crystal display of claim 10, wherein the second panel of the electrophoretic display is arranged over the first panel.

16. The transflective liquid crystal display of claim 10, wherein the first substrate of the liquid crystal panel includes:
   an opaque matrix layer to define the plurality of pixels; and
   wherein the first conducting electrode of the electrophoretic display is formed within a lateral boundary of the opaque matrix layer.

17. The transflective liquid crystal display of claim 11, wherein after the voltage is applied to the first conducting electrode, the transflective liquid crystal display remains in the transmissive mode until another voltage of opposite polarity is applied to the first conducting electrode.

18. The transflective liquid crystal display of claim 12, wherein after the voltage is applied to the second conducting electrode, the transflective liquid crystal display remains in the reflective mode until another voltage of opposite polarity is applied to the second conducting electrode.

19. The transflective liquid crystal display of claim 10, wherein the first substrate includes color filter elements located in the plurality of pixels.

20. A transflective liquid crystal display device, comprising:
   a liquid crystal panel having a plurality of switchable pixels operable to selectively transmit light;
   a backlight arranged under the liquid crystal panel; and
   an electrophoretic device arranged between the liquid crystal panel and the backlight operable to selectively transmit light from the backlight or reflect light from external to the transflective liquid crystal display device based on a polarity of a voltage applied thereto.

21. The transflective liquid crystal display of claim 20, wherein the electrophoretic device includes:
   a first conducting electrode which defines a plurality of transmitting regions corresponding to the switchable pixels;
   a second conducting electrode, and
   a transparent liquid interposed between the first and second electrodes having charged particles therein.

22. The transflective liquid crystal display of claim 21, wherein when a voltage of a first polarity is applied between the first and second electrodes, the charged particles are attracted to the first electrode, allowing light from the backlight to be transmitted through the electrophoretic device.

23. The transflective liquid crystal display of claim 21, wherein when a voltage of a second polarity is applied between the first and second electrodes, the charged particles are attracted to the second electrode, reflecting light from external to the transflective liquid crystal display device.

24. The transflective liquid crystal display of claim 20, wherein the liquid crystal panel includes color filters corresponding to the switchable pixels.

* * * * *